United States Patent
Byram

(10) Patent No.: US 6,891,456 B2
(45) Date of Patent: May 10, 2005

(54) MULTI-POLE ELECTROMAGNETIC MOTOR APPARATUS AND METHOD OF ASSEMBLING

(75) Inventor: Robert James Byram, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 10/166,827

(22) Filed: Jun. 10, 2002

(65) Prior Publication Data

US 2003/0227362 A1 Dec. 11, 2003

(51) Int. Cl.⁷ .............................................. H01F 7/08
(52) U.S. Cl. ........................................ 335/225; 310/71
(58) Field of Search ............................... 335/220–229; 310/71, 83, 194, 254; 336/192, 198

(56) References Cited

U.S. PATENT DOCUMENTS

| | | | |
|---|---|---|---|
| 5,087,868 A | * | 2/1992 | Ishibashi et al. ............. 318/696 |
| 5,512,871 A | | 4/1996 | Oudet et al. |
| 5,661,446 A | | 8/1997 | Anderson et al. |
| 6,020,804 A | | 2/2000 | Gandel |
| 6,107,704 A | * | 8/2000 | Wallner et al. ....... 310/40 MM |
| 6,291,914 B1 | * | 9/2001 | Mukaiyama .............. 310/68 B |
| 6,407,528 B1 | | 6/2002 | Disser et al. |
| 6,411,061 B1 | | 6/2002 | Disser et al. |
| 6,667,565 B2 | * | 12/2003 | Strobl ........................ 310/237 |
| 2001/0013728 A1 | * | 8/2001 | Harita et al. .................. 310/71 |
| 2002/0067093 A1 | * | 6/2002 | Das ............................. 310/179 |
| 2003/0201681 A1 | * | 10/2003 | Shimizu et al. ............... 310/51 |
| 2003/0222519 A1 | * | 12/2003 | Bostwick ..................... 310/58 |

* cited by examiner

Primary Examiner—Lincoln Donovan
(74) Attorney, Agent, or Firm—Jimmy L. Funke

(57) ABSTRACT

A structure and methodology of fabrication for a cost effective multipole motor adapted to high volume manufacture. The apparatus includes a low cost housing within which a stator assembly comprised of interchangeable stator electromagnets is installed. A rotor assembly including a plurality of sense magnets and motor magnets integrated onto a rotor shaft is also used. A cover assembly is attached to complete the device. The cover assembly includes a lead frame interconnection assembly and a magnetic sensor adapted to detect the passing of sense magnets to determine the position of the rotor shaft.

10 Claims, 4 Drawing Sheets

US 6,891,456 B2

MULTI-POLE ELECTROMAGNETIC MOTOR APPARATUS AND METHOD OF ASSEMBLING

TECHNICAL FIELD

The invention relates to a multiple pole electromagnetic motor design and method of assembling.

BACKGROUND OF THE INVENTION

The expansion in use of electric motors in numerous consumer applications leads to a desire for more efficient and cost effective manufacture and fabrication of the same. Multiple pole motors of various types are well known in the art. One such existing motor of the aforementioned general type is depicted in FIGS. 1A and 1B. In reference to those figures, such a motor is typically fabricated from a complex machined stator assembly requiring detailed, expensive, labor-intensive operations. Further, such a machined stator assembly is commonly machine wound and installed into a housing, yet not readily or easily removed or replaced.

The machined stator assembly would also typically employ interconnections that are commonly hand-connected or soldered to terminals for external connection. Soldered or hand connected terminals are commonly time-consuming to complete and difficult to repair. Soldering has also received significant scrutiny for its environmental and health related impacts in recent years. The rotor of such an existing motor is conventionally mounted by employing two or more bearings at each end of the shaft configured in such a way as to constrain both radial and axial displacement.

As is clear, there are many design, construction, and assembly limitations within the existing art. The existing art is not conducive to providing a lower cost motor, nor is it adapted to high volume manufacture. The above-identified drawbacks of the prior art are overcome by the structure and method described herein.

SUMMARY OF THE INVENTION

The invention provides a lower cost motor that is readily adapted to high volume manufacture. Specifically, the invention is directed to an apparatus and method of fabrication of a cost-effective multipole motor in high volumes. The motor assembly includes a housing, a stator assembly, a rotor assembly, and a cover assembly. The stator assembly, which is comprised of interchangeable stator electromagnets, is installed into the low cost housing. The rotor assembly includes a plurality of sense magnets and motor magnets integrated onto a rotor shaft. The cover assembly attaches to an end of the housing, and includes a magnetic sensor, a lead frame interconnection assembly, and an external electrical connector. The magnetic sensor is adapted to detect the passing of sense magnets that are on the rotor shaft, and provides for determining the position of the rotor shaft. The lead frame interconnection assembly provides for electrical connection between the external connector, and the sense magnets and the motor magnets. This eliminates a printed circuit board and hand wiring. These and other features of the invention will become apparent to those skilled in the art upon reading and understanding the following detailed description of the embodiments.

BRIEF DESCRIPTION OF THE DRAWINGS

Referring now to the drawings wherein like elements are numbered alike in the several FIGURES.

DETAILED DESCRIPTION OF THE INVENTION

The present invention may be utilized in various types of motors and other rotational devices such as motors employed in a vehicle control system. One embodiment of the invention, by way of illustration is described herein as it may be applied to a multipole motor utilized in an air control valve. While this embodiment of the invention is shown and described, it will be appreciated by those skilled in the art that the invention is not limited to air control valves alone, but may be applied to multipole motors and their applications in general.

Figure 1:
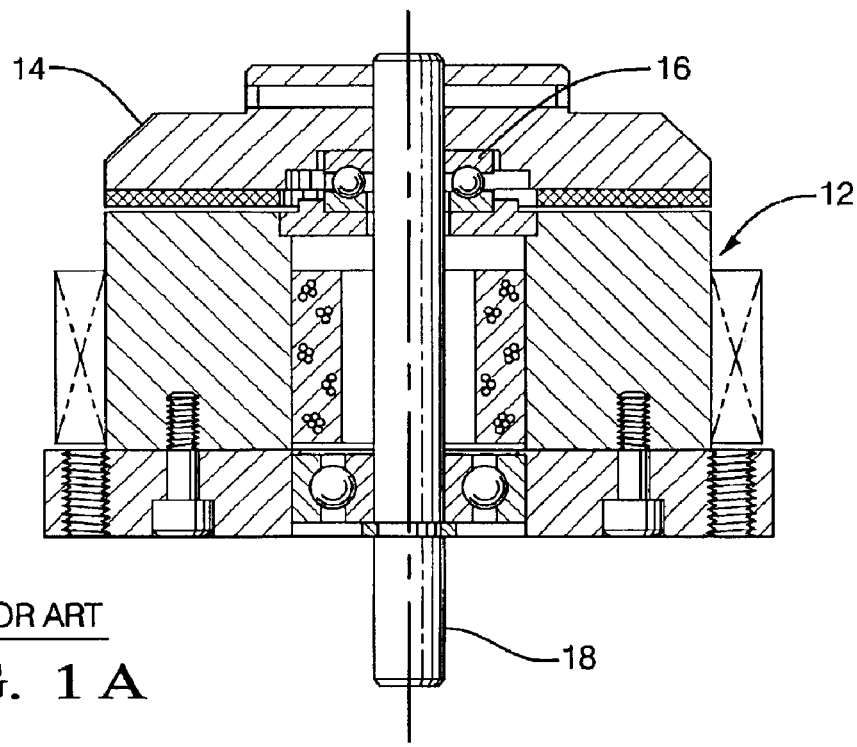
FIG. 1A depicts a cross sectional view of a prior art design multipole motor.
FIG. 1B depicts a drive end view of the multipole motor of FIG. 1A.
Figure 1:
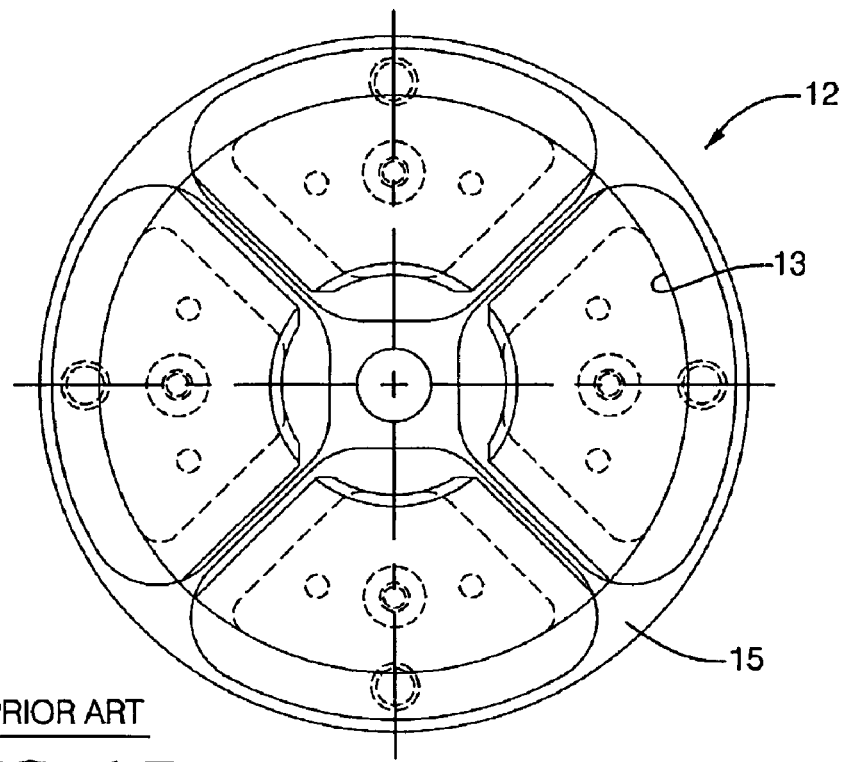

Referring now to FIGS. 1A and 1B, a multipole motor 12 is shown that includes a complex machined stator assembly 13 that requires detailed, expensive, labor-intensive operations to manufacture. It also includes a shaft 18, a shaft bearing 16, and a rotor iron and magnets 14. The machined stator assembly 13 is commonly machine wound and installed into a housing 15, yet is not readily or easily removed or replaced.

Figure 2:
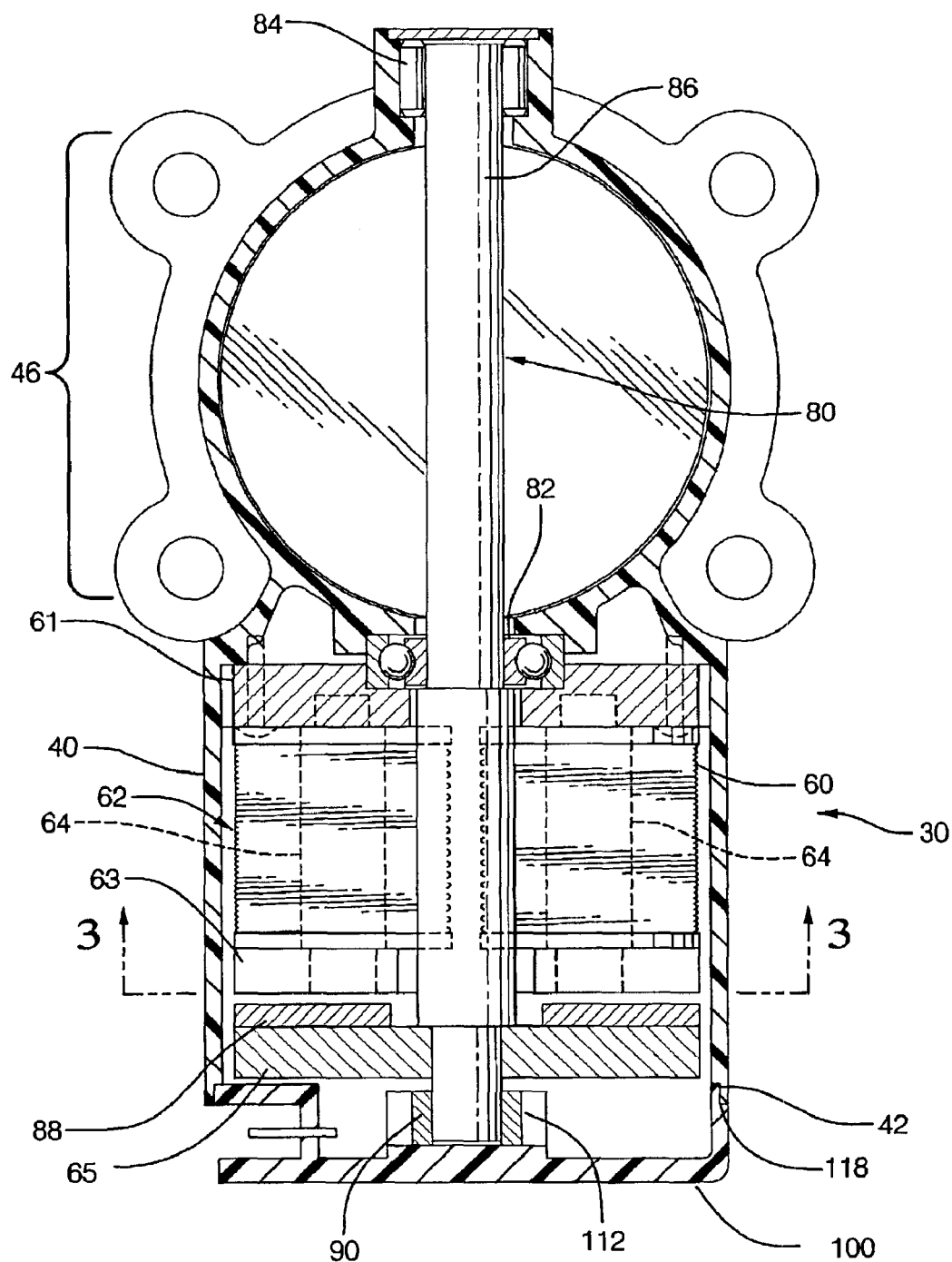
FIG. 2 is an elevation view, partially in cross-section, of the multipole motor of the present invention.
Figure 3:
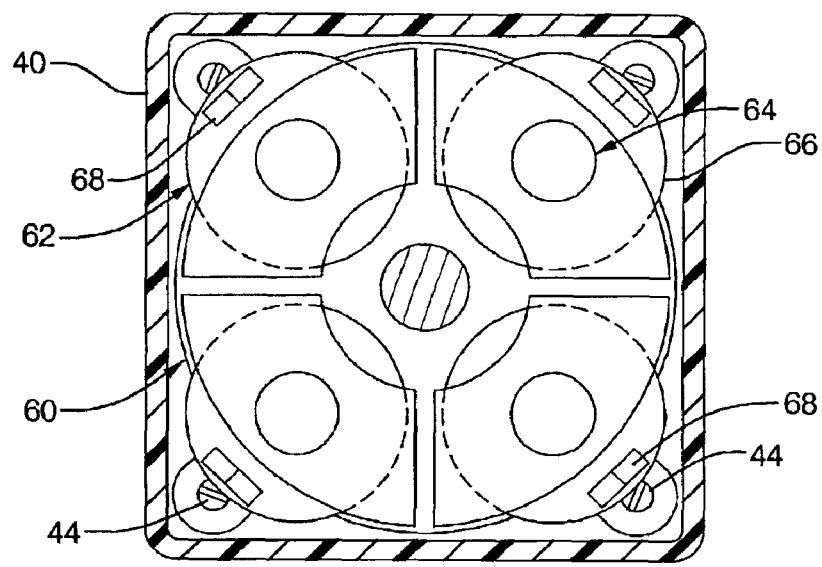
FIG. 3 is a plan view, partially in cross-section of the multipole motor of FIG. 2.

FIGS. 2 and 3 depict one embodiment of the invention as illustrated by application to a multipole motor 30. The motor 30 includes a housing 40, a stator assembly 60, a rotor assembly 80, and a cover assembly 100. The housing 40 as depicted, is designed to simplify manufacture and facilitate assembly. This has been accomplished by redesigning certain components for ease of manufacture and assembly. For example, the housing 40 may be fabricated of molded plastic or an aluminum casting. Further, the housing 40 may incorporate the actuated device, e.g. an air control valve 46. Additionally, the housing 40 is configured in a manner that allows the stator electromagnets 62 to be modular and interchangeably arranged within the housing 40. Such a process saves considerable effort and time in fabrication. The housing 40 includes a plurality of cavities shaped and sized to receive the plurality of stator electromagnets 62. The housing 40 also includes a cavity to accommodate a shaft bearing 82.

Figure 5:
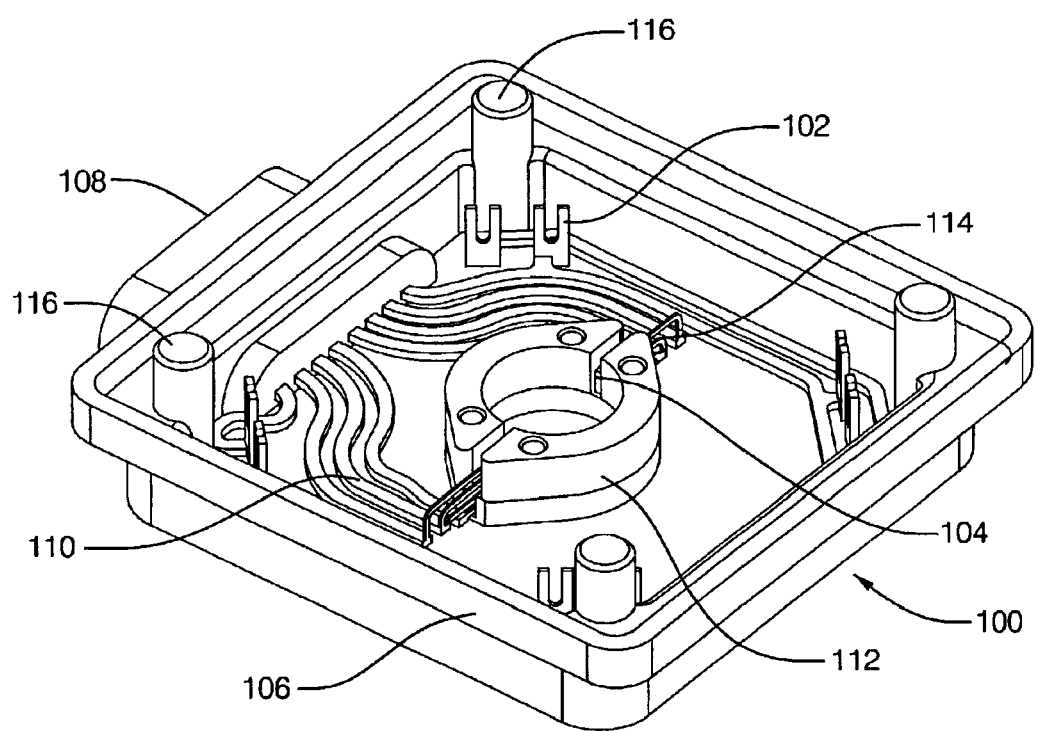
FIG. 5 is a perspective view of the cover assembly of the present invention.

In this embodiment, the housing 40 combines the encasement for the motor and air control valve 46 in a single structure. The housing 40 at the motor portion is primarily cubic. The four sides are essentially square, the bottom is the actuated device 46, and the top is open, and interfaces and mates with the cover assembly 100 (FIG. 5). The top portion of the housing 40 includes a cutout, stepped, lip 42 in the wall thickness about the perimeter to facilitate mating and sealing with the cover assembly 100 (FIG. 5). The cover assembly 100 includes a similar, but opposite mating lip 118 on its sides. The housing 40 includes openings for the shaft bearing 82 and a second bearing 84. The housing 40 also includes four posts 44, placed near each corner, that are cylindrically shaped. These posts 44 are positioned such that alignment posts 116 (FIG. 5) on the cover assembly 100 enter and engage the respective mating posts 44 in the housing 40 upon assembly, thereby assuring proper alignment of the cover assembly 100 to the housing 40. Further, each of the four posts 44 in the housing 40 may receive a fastener (e.g. be threaded) for securing the cover assembly 100 to the housing 40.

Figure 4:
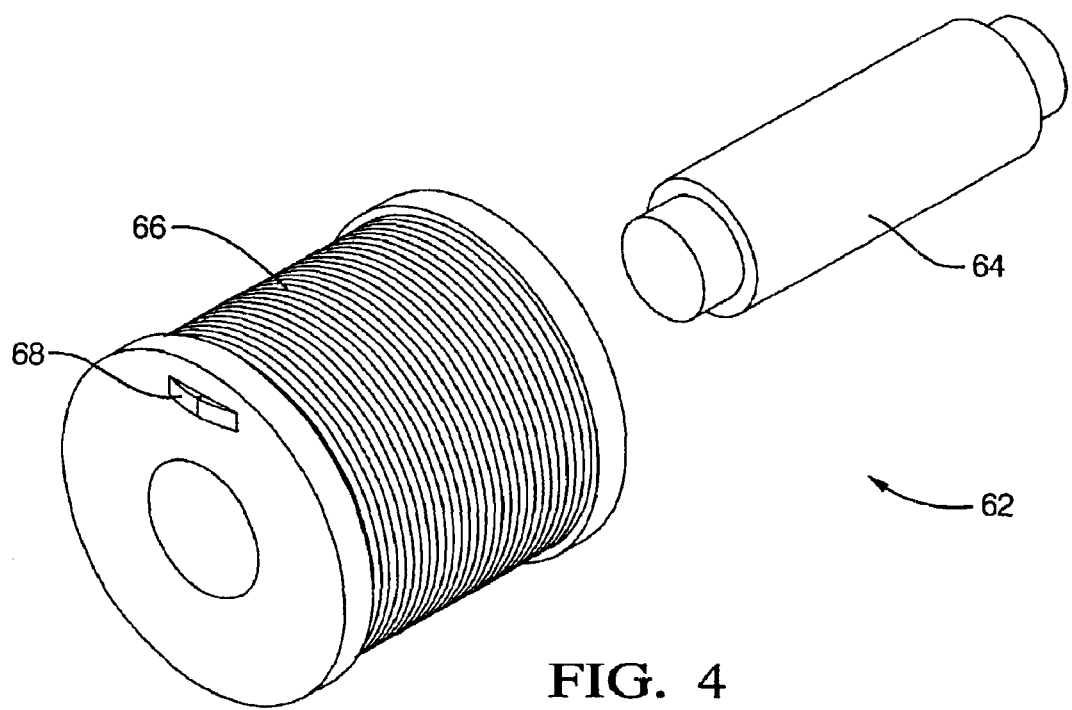
FIG. 4 is a perspective view of the stator winding of the present invention.

Referring again to FIGS. 2 and 3, the stator assembly 60 is modular in structure, comprised of a plurality of interchangeable stator electromagnets 62 cylindrical in shape, each characterized by an interchangeable, cylindrical, ferromagnetic core 64 around which an interchangeable, cylindrical, bobbin wound, stator winding 66 is arranged. The stator winding 66, shown in FIG. 4, is annular in shape of approximately the same length as the core 64 such that when the core 64 is inserted into the vacant center portion of the annular stator winding 66, the assembly resembles a cylinder. In this embodiment four such stator electromagnets 62 are employed to comprise a stator assembly 60. The stator electromagnets 62 are placed in the housing 40 and arranged in a particular orientation that facilitates engagement and interface of the connection portion 68 with the insulation displacement terminals 102 of the cover assembly 100. This orientation is such that the flat portion of the tops of each cylindrically shaped stator electromagnet 62 and connection portion 68 are rotated about an axis parallel to the axis of rotation of the rotor assembly 80. Therefore the connection portion 68 is closest to each corner of the housing 40. The connection portion 68 includes two wires, each electrically connected to an end of the stator winding 66.

The rotor assembly 80 is comprised of a rotor shaft 86, a rotor iron 65, a plurality of motor magnets 88, a plurality of sense magnets 90, and a shaft bearing 82. The rotor shaft 86 is cylindrically shaped and made of material suitable to attach the motor magnets, sense magnets and other devices. It is designed with sufficient strength to transfer the rotational forces of the motor 30 to the actuated device, and bear a load from the actuated device, i.e. the air control valve. A longitudinal axis of the rotor shaft 86 is concentric to the longitudinal axis of the stator assembly.

The shaft bearing 82 maintains radial constraint and provides axial constraint of the rotor shaft 86. The shaft bearing 82 and second bearing 84 may comprise a sleeve, ball, or roller bearing. The shaft bearing 82 is rigidly affixed to the rotor shaft 86 approximately mid-length with its inner ring, and to the housing 40 with its outer ring. The rotation of the rotor assembly 80 is further facilitated and radially restricted by the second bearing 84 mounted near end of the rotor shaft 86 in proximity to the actuated device 46. Those skilled in the art will understand that such a configuration provides the necessary mechanical constraints on the rotor shaft 86, while also providing for rotational freedom while limiting translation. Further, it is understood that such a configuration provides greater radial constraint of the rotor shaft 86 in proximity to the actuated device 46 and thereby allows for tighter control of tolerances on the actuated device 46 interface with the housing 40.

The rotor iron 65 is a flat disk that is operably attached to the rotor shaft 86 near one end. The plane of the rotor iron 65 is perpendicular to and concentric to the longitudinal axis of the rotor shaft 86. Affixed to the rotor iron 65 are a plurality of motor magnets 88. The motor magnets 88 are also concentric with the rotor shaft 86 and positioned in a manner such that the flux lines radiate parallel to the axis of rotation of the rotor shaft 86. The motor magnets 88 are arranged to provide maximal torque per motor diameter by utilizing a distribution that allows the motor magnets 88 to occupy the maximum possible diameter within a given size housing 40. That is, the outer diameter of the motor magnets 88 is nearly equivalent to the inner diameter of the housing 40. This configuration allows the invention as embodied to produce torque levels in excess of those produced by conventionally designed similarly sized motors where the motor magnets are typically placed at a radius smaller than the stator.

There is also a plurality of sense magnets 90 provided to detect rotation of the rotor assembly 80 and thus the motor 30. This attachment alleviates later assembly and thus saves fabrication effort. The sense magnets 90 combined with the magnetic sensor 104 (FIG. 5) provide position-sensing capability. The sense magnets 90 positioned circumferentially around a distal portion of a first end of the rotor shaft 86 and are integrated thereon. The sense magnets 90 align axially with a flux carrier 112 and a magnetic sensor 104 (FIG. 5) of the cover assembly 100 (FIG. 5). The changing magnetic field is detected by the magnetic sensor 104, which outputs a voltage responsive to the passing of each of the sense magnets 90 and therefore the position of the rotor assembly 80.

FIG. 5 depicts the cover assembly 100, which is comprised of a cover 106 upon which is mounted an external electrical connector 108, the flux carrier 112, the magnetic sensor 104, and a lead frame interconnection assembly 110.

In this embodiment, the cover 106 is primarily rectangular in shape with four sides and a base. The external electrical connector 108 protrudes through one of the sides. The cover 106 also includes a base upon which the magnetic sensor 104 and the lead frame interconnection assembly 110 are mounted. Furthermore, the cover 106 includes four alignment posts 116, placed near each corner of the cover 106 cylindrically shaped and positioned such that the posts enter and engage mating posts 44 in the housing 40 upon assembly. The sides of the cover 106 include a cutout, stepped, mating lip 118 (FIG. 2) in the wall thickness about the perimeter to facilitate mating and sealing with the housing 40 (FIGS. 2 and 3). The cover 106 is also configured to mate and be attached to the housing 40 in a manner that allows the insulation displacement terminals 102 to be forcibly and securely compressed upon the connection portion 68 of the stator winding 66. This provides electrical connectivity to each stator assembly 60.

The external electrical connector 108 of this embodiment is approximately rectangular with semicircular sides on the shorter sides. One skilled in the art will understand that the connector can take many shapes and configurations appropriate with a specific design, or to accommodate a specific connector. In this embodiment the longer sides lie in a plane parallel to the base of the cover 106. The external electrical connector 108 is connected to the magnetic sensor 104 and insulation displacement terminals 102 via the lead frame assembly 110. The lead frame assembly 110 is integrated with the insulation displacement terminals 102 and the magnetic sensor 104, thus eliminating separate interconnects, hand connections, and a circuit substrate.

The flux carrier 112 is approximately annular in shape and resembles two crescent-like halves placed together to form a journal. It has a cylindrical center portion sized to accept an end of the rotor shaft 86 with the integrated sense magnets 90. The flux carrier 112 is positioned on the cover 106 such that the cylindrical center portion is concentric with the rotor shaft 86 when assembled. The rotor shaft 86 can enter and engage the journal when the cover assembly is attached to the housing 40, thus placing the integrated sense magnets 90 on the rotor shaft in close proximity to the magnetic sensor 104. The flux carrier 112 provides an aperture 114 at the mating points of the two halves within which the magnetic sensor 104 is positioned.

The insulation displacement terminals 102 are positioned orthogonal to the base of the cover 106 and positioned on the cover 106 in a manner such that they are aligned with the connection portion 68 of the stator winding 66 of each stator assembly 60. The insulation displacement terminals 102 are bifurcated terminals formed as part of the lead frame assembly 110. They are configured to accept, hold, and make electrical contact with the wire at the connection portion 68 of the stator winding 66 of each stator assembly 60 when the cover assembly 100 is assembled onto the housing 40.

The invention can also include multipole motors where the longitudinal axis of the rotor shaft 86 is parallel to but eccentric to the housing 40. In this instance, corresponding adaptations to the cover assembly 100, rotor assembly 80, and stator assembly 60 will be made to accommodate the eccentricity while still maintaining the essence of the apparatus and assembly.

It will be understood that one skilled in the art may make modifications to the embodiment shown herein within the scope and intent of the claims. The invention has been described with specific reference to the preferred embodiments and modifications thereto. Further modifications and alterations may occur to others upon reading and understanding the specification. It is intended to include all such modifications and alterations insofar as they come within the scope of the invention.

What is claimed is:

1. A multipole motor assembly, comprising:
    a stator assembly, comprising: a housing including a plurality of cavities disposed circumferentially around an axis; each cavity containing a modular, interchangeable stator electromagnet;
    a rotor assembly; and,
    a cover assembly attached to an end of the housing, comprising an external electrical connector, a sensor, a flux carrier, a plurality of insulation displacement terminals, and, means for connecting said sensor and said plurality of insulation displacement terminals to said electrical connector;
    wherein said sensor is operable to measure a rotational position of the rotor assembly;
    wherein each stator electromagnet is secured in the stator housing by the cover assembly; and,
    wherein each of the insulation displacement terminals connects electrically to a terminal of one of the modular, interchangeable stator electromagnets when the cover assembly is attached to the end of the housing.

2. The multipole motor assembly of claim 1, wherein each of the plurality of stator electromagnets is cylindrically shaped.

3. The multipole motor assembly of claim 1, wherein each of the plurality of stator electromagnets is characterized by a bobbin wound coil.

4. The multipole motor assembly of claim 1, wherein the rotor assembly comprises:
    a rotor shaft with a first and a second end;
    a plurality of sense magnets positioned circumferentially around a distal portion of said first end of the rotor shaft;
    a disk-shaped rotor iron, operably attached perpendicularly and concentrically to a longitudinal axis of the rotor shaft adjacent the plurality of sense magnets; and
    a plurality of motor magnets operably attached to said rotor iron.

5. The multipole motor assembly of claim 4, wherein the longitudinal axis of the rotor shaft is coaxial with said axis of the stator assembly and passes therethrough.

6. The multipole motor assembly of claim 4, wherein an outer diameter of said plurality of motor magnets is substantially equal to an inner diameter of said housing.

7. The multipole motor assembly of claim 4, wherein the longitudinal axis of the rotor shaft is parallel to said axis of the stator assembly.

8. The multipole motor assembly of claim 1, wherein said means for connecting said sensor and said plurality of insulation displacement terminals to said electrical connector is a lead frame interconnection assembly.

9. A multipole motor assembly, comprising:
    a stator assembly, comprising: a housing including a plurality of cavities disposed circumferentially around an axis; each cavity containing a modular, interchangeable stator electromagnet;
    a rotor assembly;
    a rotor shaft with a first and a second end;
    a plurality of sense magnets positioned circumferentially around a distal portion of said first end of the rotor shaft;
    a disk-shaped rotor iron, operably attached perpendicularly and concentrically to a longitudinal axis of the rotor shaft adjacent the plurality of sense magnets;
    a plurality of motor magnets operably attached to said rotor iron; and,
    a cover assembly attached to an end of the housing, comprising an external electrical connector, a sensor, a flux carrier, a plurality of insulation displacement terminals, and, means for connecting said sensor and said plurality of insulation displacement terminals to said electrical connector;
    wherein said sensor is operable to measure a rotational position of the rotor assembly;
    wherein each stator electromagnet is secured in the stator housing by the cover assembly; and,
    wherein each of the insulation displacement terminals connects electrically to a terminal of one of the modular, interchangeable stator electromagnets when the cover assembly is attached to the end of the housing.

10. A multipole motor assembly for an air control valve, comprising:
    a single piece housing comprising a stator assembly and a body for the air control valve,
    the stator assembly comprising a housing including a plurality of cavities disposed circumferentially around an axis, each cavity containing a modular, interchangeable stator electromagnet;
    a rotor assembly; and,
    a cover assembly attached to an end of the housing, comprising an external electrical connector, a sensor, a flux carrier, a plurality of insulation displacement terminals and means for connecting said sensor and said plurality of insulation displacement terminals to said electrical connector;
    wherein the sensor is operable to measure a rotational position of the rotor assembly;
    wherein each stator electromagnet is secured in the stator housing by the cover assembly; and,
    wherein each of the insulation displacement terminals connects electrically to a terminal of one of the modular, interchangeable stator electromagnets when the cover assembly is attached to the end of the housing.

* * * * *